United States Patent
Ayers et al.

(10) Patent No.: US 7,564,968 B2
(45) Date of Patent: Jul. 21, 2009

(54) VOICE CONTAINMENT DEVICE FOR A TELEPHONE

(76) Inventors: Ronald Lee Ayers, 364 Beemer Ave., Sunnyvale, CA (US) 94086; Ada Marie Bull, 324 Angel Ave., Sunnyvale, CA (US) 94086

( * ) Notice: Subject to any disclaimer, the term of this patent is extended or adjusted under 35 U.S.C. 154(b) by 798 days.

(21) Appl. No.: 11/040,480

(22) Filed: Jan. 20, 2005

(65) Prior Publication Data
US 2006/0159278 A1 Jul. 20, 2006

(51) Int. Cl.
*H04M 1/00* (2006.01)
*H04M 9/00* (2006.01)

(52) U.S. Cl. ........................ 379/440; 379/451

(58) Field of Classification Search ............ 379/428.01, 379/433.11, 440, 446, 451, 453, 433.01, 379/434, 433.12, 441, 450, 437, 452, 439, 379/433.03, 420.03, 444; 455/90.3, 347, 455/575.3, 575.8
See application file for complete search history.

(56) References Cited

U.S. PATENT DOCUMENTS

| | | | |
|---|---|---|---|
| D307,753 S | | 5/1990 | Oliver |
| D338,675 S | | 8/1993 | Wharton et al. |
| D339,141 S | | 9/1993 | Ghasemi |
| D342,262 S | * | 12/1993 | Hester ........................ D14/250 |
| D358,396 S | | 5/1995 | Holbeck |
| D372,920 S | * | 8/1996 | Bragg et al. ................ D14/250 |
| D380,477 S | | 7/1997 | Williams et al. |
| D395,898 S | | 7/1998 | Suzuki |
| 5,778,062 A | | 7/1998 | Vanmoor |
| D400,541 S | * | 11/1998 | Harrison .................... D14/250 |
| 5,862,215 A | * | 1/1999 | Garriette .................... 379/452 |
| D408,036 S | | 4/1999 | Marshall |
| D435,547 S | | 12/2000 | Reed |
| 6,315,182 B1 | * | 11/2001 | Chen .......................... 224/420 |
| 6,510,311 B1 | * | 1/2003 | Stitt .......................... 455/90.3 |
| D500,313 S | * | 12/2004 | Mason ....................... D14/250 |
| 2007/0060224 A1 | * | 3/2007 | Liu ........................... 455/575.8 |

FOREIGN PATENT DOCUMENTS

JP 08154119 A * 6/1996

* cited by examiner

*Primary Examiner*—Curtis Kuntz
*Assistant Examiner*—Phylesha Dabney
(74) *Attorney, Agent, or Firm*—Schneck & Schneck; David M. Schneck

(57) ABSTRACT

A telephone voice containment device is described. It includes a housing which is shaped to receive a voice pick-up mechanism of a telephone in order to capture the voice utterances to be picked up by such phone, and at the same time prevent the voice utterances from escaping to the area surrounding the telephone. An elastic band is included to hold the telephone casing and, hence, its pick-up mechanism in the housing. A sound absorbing structure is most desirably included within the housing to absorb voice utterances not needed by the telephone pick-up mechanism.

5 Claims, 3 Drawing Sheets

VOICE CONTAINMENT DEVICE FOR A TELEPHONE

BACKGROUND OF THE INVENTION

This invention relates to a telephone voice containment device which is quite simple and yet is effective in assuring that a voice directed to the microphone of a telephone is received while most of the voice utterances do not escape into the surrounding area.

Telephones typically have a microphone or other voice pick-up mechanism designed to receive voice utterances which define the signal to be transmitted. Although most telephones pick up enough voice for effective operation, the unneeded voice utterances are often bothersome to any of those in the surrounding area who might have to hear them. Moreover, in some situations the speaker wishes to make his voice utterances confidential and does not want them to be heard by those surrounding the telephone.

SUMMARY OF THE INVENTION

The present invention is a voice containment device for a telephone which alleviates the problem of voice utterances directed to a telephone also being heard in a surrounding area. It does this while positioning the telephone microphone or other voice pick-up mechanism to properly receive the speaker's voice utterances.

In its basic aspects, the voice containment device of the invention includes a housing which is shaped to receive the voice pick-up mechanism of the telephone and to capture the voice utterances to be picked up by such device. The housing acts to prevent the voice utterances from escaping to the area surrounding the telephone while assuring that they are received by the telephone pick-up mechanism. Means are provided to hold the pick-up mechanism in the housing.

Most desirably the housing further includes a sound absorbing structure to absorb voice utterances not needed by said pick-up mechanism. Other features and advantages of the invention will become apparent or will be described in connection with the following more detailed description of a preferred embodiments.

BRIEF DESCRIPTION OF THE DRAWINGS

With reference to the accompanying sheets of drawing.

DETAILED DESCRIPTION OF THE PREFERRED EMBODIMENT

Figure 1:
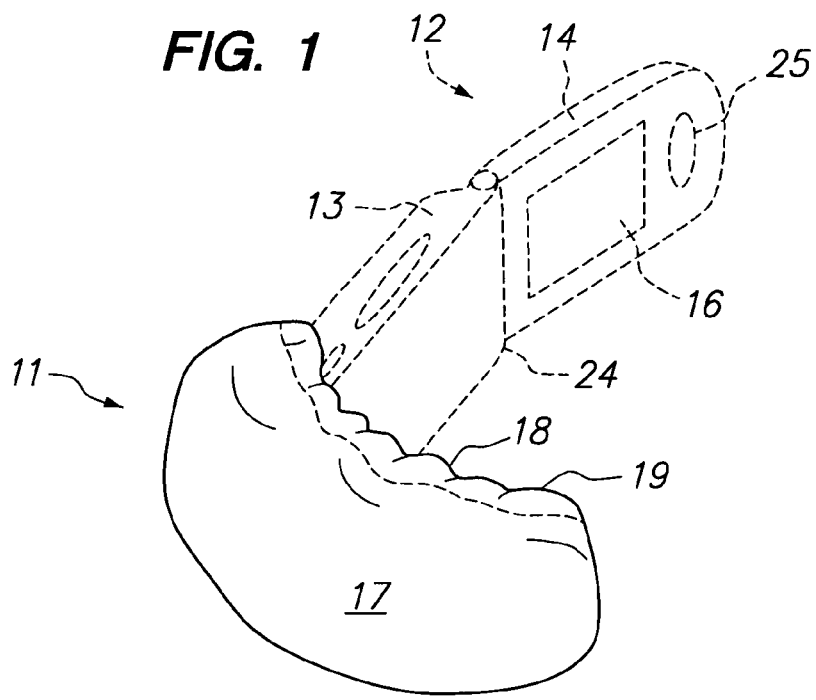
FIG. 1 is an isometric view of a preferred embodiment of a voice containment device of the invention interacting with a flip-open type cell phone.

The following, relatively detailed description is provided to satisfy the patent statutes. It will be appreciated by those skilled in the art, though, that various changes and modifications can be made without departing from the invention.

A preferred embodiment of the voice containment device of the invention is generally referred to by the reference numeral 11 in FIGS. 1-5. The containment device or, in other words, pouch is shown interacting with a flip-open type cell phone 12. Such cell phone includes both a main body 13 having the typical keypad and control buttons (not shown) and a cover 14 having a display screen 16.

The voice containment device 11 is an elongated housing 17 of a flexible fabric such as leather. The housing has a relatively large opening 18 along one of its long sides both to accommodate the microphone end of the telephone as will be described and to capture the voice utterances directed to the microphone.

Figure 3:
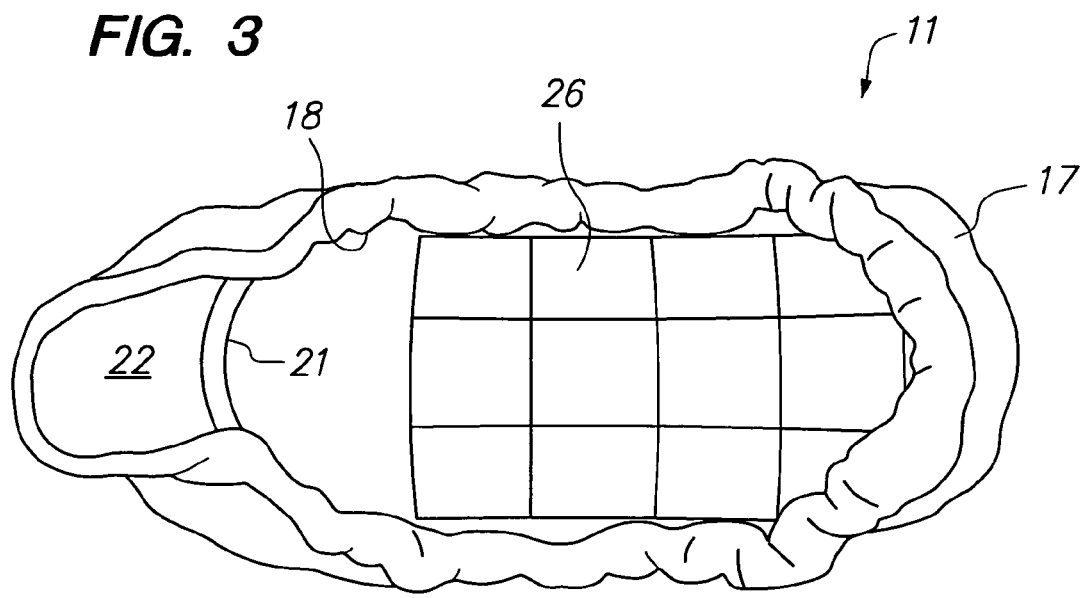
FIG. 3 is top elevation view of the preferred embodiment of the voice containment device illustrated in FIG. 1.

The majority of the opening 18 is gathered by elastic. In this connection, the material of the containment device is folded over at the opening 18 and stitched as indicated at 19 to form a channel containing an elastic band 21. As illustrated in FIG. 3 the elastic band 21 does not extend for the full edge of the opening but rather extends between the long side edges of the opening, leaving a portion 22 which is unaffected by such band. (The purpose of portion 22 will become apparent further in this description.)

While in this particular implementation the channel for the band 21 is formed around the edge by the flexible material of the voice containment device being simply folded over and stitched, it will be recognized by those skilled in the art that other arrangements also can be provided. For example, a separate channel piece for the band 21 can be secured around the edge simply by providing a separate piece of material and stitching it about such edge.

Figure 2:
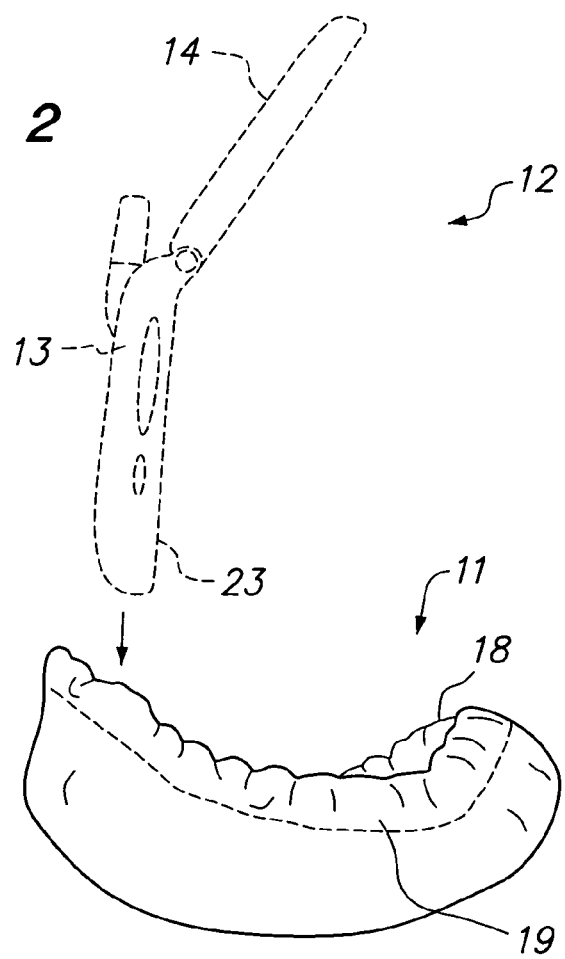
FIG. 2 a side elevation view of the arrangement of FIG. 1, showing the telephone separated from the voice containment device and showing how it interacts with such voice containment device.

In accordance with normal arrangements and as shown in FIG. 2, the body 13 of the telephone device includes a microphone or other voice pick-up mechanism 23 at its free end. It also includes a casing 24 within which the microphone 23 is located. The free end of the telephone 12 with the pick-up device 23 fits through the opening 18 within the end of the housing 17. The end with its associated microphone will fit within the space 22 within the housing and is held in position by the band 21 pressing the same against the wall of the opening. The housing and band are sized so that this is a relatively tight fit. Thus, the band acts as means to maintain the containment device on the telephone and, in this connection, the elasticity of the band 21 allows some adjustment in size to accommodate differently sized telephones.

It will be seen that when a telephone is positioned to interact with the voice containment device of the invention in the manner described, the arrangement shown in FIG. 1 will result. When a user holds the telephone adjacent his/her head as is normal with the earpiece 25 in position, said user will find his/herself speaking voice utterances into the voice containment device. In other words, the opening of the voice containment device not only receives the voice pick-up mechanism of the telephone but also captures the voice utterances to be picked up. In this connection, the housing is configured to position the opening to receive most of such voice utterances.

As is illustrated, the opening is forced by the band to be slightly curved. This curve matches generally the curve of a human face adjacent its mouth. That is, the elastic gathers the housing at the opening to provide such curve. This configuration enhances the capture of the voice utterances. Thus, the elastic band 21 serves two functions. It maintains the voice containment device in position and aids in curving the opening 18 to enhance voice capturing.

While the pouch like shape of the voice containment device, will result in the capturing of most voice utterances and the prevention of the escape of them to the area surrounding the user, most desirably a sound absorbing structure is provided within the interior of the housing in order to absorb those voice utterances not needed by the telephone pick-up mechanism. Such sound absorbing structure most simply can be a flexible sheet of plastic foam 26 adhered within the housing to its bottom. As illustrated, its position is selected to absorb those voice utterances received within the housing that are not needed by the pick-up mechanism.

Figure 4:
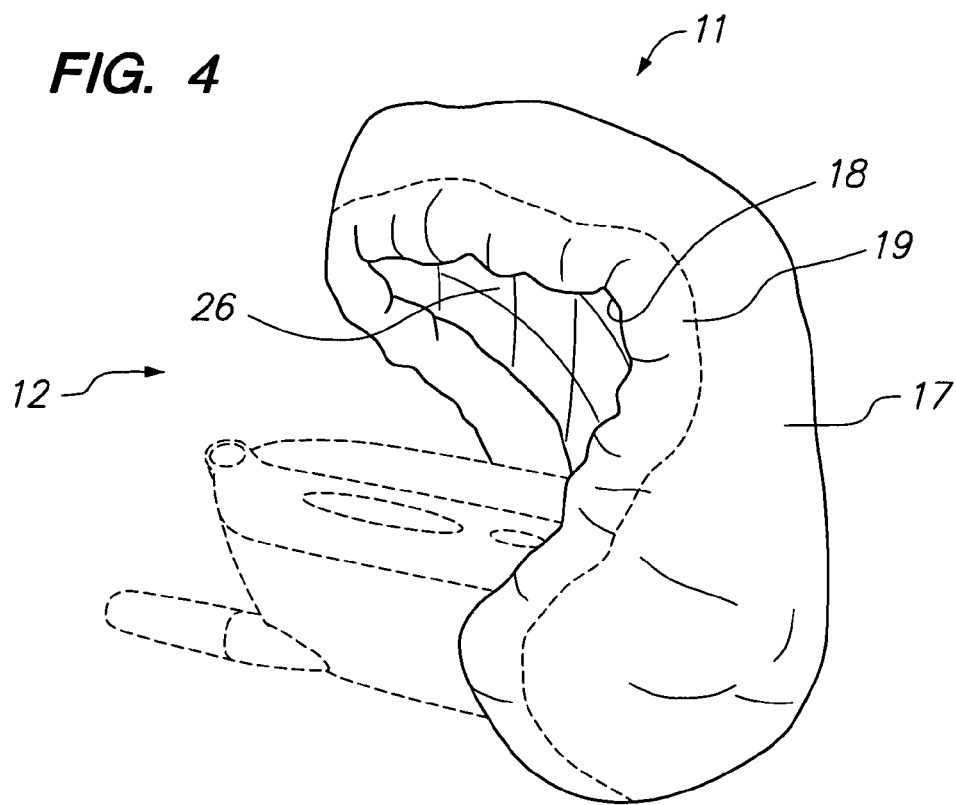
FIG. 4 is another isometric view illustrating the interaction of the voice containment device of the invention with a flip-open type cell phone when it is closed.

The cell phone 12 with which the preferred embodiment 11 of the invention is being described, is of the flip-open type as mentioned previously. It is shown in FIGS. 1 and 2 in its open position with the cover 14 extended outwardly from the body 13. It can be simply closed as shown in FIG. 4 with the elastic band 21 sandwiched between the body and cover.

Figure 5:
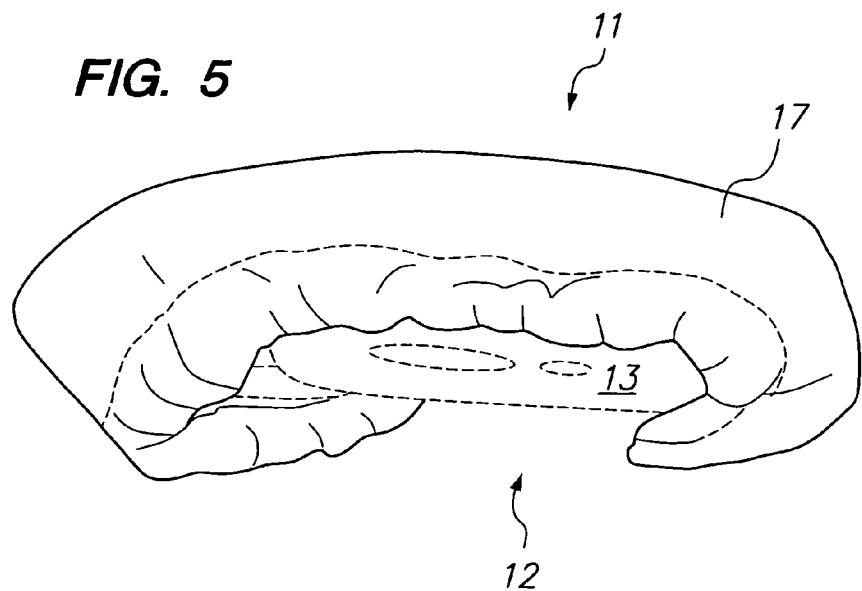
FIG. 5 is a side elevation view of the preferred embodiment of FIG. 1, with the voice containment device accommodating the full telephone.

As another feature of this embodiment of the invention, the opening and housing are sized to accommodate the full telephone when desired as illustrated in FIG. 5. The result is that when the telephone is not being used, the voice containment device of the invention acts as a protective casing.

The embodiment of the invention described to this point is of the so-called "universal" type in that it is designed to interact with many different telephones irrespective of their manufacturer. In this connection, it is simply used with a standard cell phone which is not of the flip-open type. It will be recognized by those skilled in the art how such a telephone simply can be substituted for the telephone 12.

Figure 6:
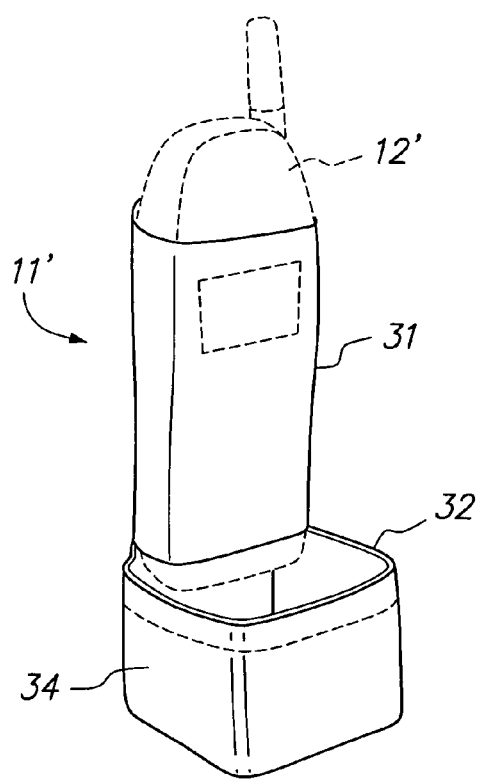
FIG. 6 is an isometric view of another embodiment of the invention especially designed for a particular cell phone.
Figure 7:
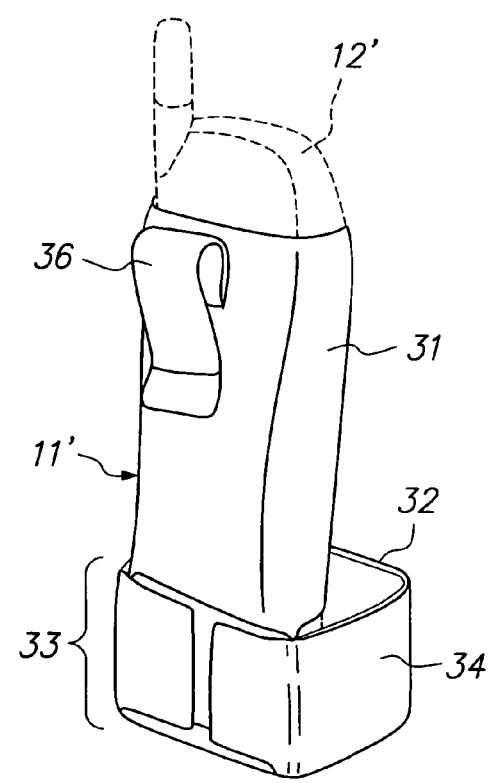
FIG. 7 is a rear isometric view of the embodiment of FIG. 6 showing details.

FIGS. 6 and 7 illustrate an embodiment of the invention designed for a specific telephone 12'. It includes a sleeve 31 within which the body of the telephone is located. In this embodiment, it is the sleeve 31 which acts as means to maintain the telephone microphone in the housing. The voice capturing portion 32 of the housing extends generally at a right angle from the sleeve 31 and as illustrated includes a loop and fabric fastener, generally referred to by the reference numeral 33, at its rear side to enable the size of the voice capture portion 32 to be adjusted. In this connection, it will be seen that the fastening position of the fastener will result in variations as desired in the length of the opposite side 34 of the voice capturing portion of the housing.

The simplicity and yet effectiveness of the invention is apparent from the above description of preferred embodiments. As mentioned at the beginning of the detailed description, though, applicant is not limited to these specific embodiments. For example, although the invention has been described in connection with cell phones, it is not limited to use with cell phones. It can be used with the handsets of typical land telephones. If the telephone handset includes a cord connective to a base, the embodiment described can be used with the same with a simple hole or the like provided to enable passage of the cord. The claims, their equivalents, and their equivalent language define the scope of protection.

What is claimed is:

1. A voice containment device for a telephone, said telephone having a voice pick-up mechanism within a casing, said device comprising:
    a housing including:
    attachment means for attaching said voice containment device, said attachment means including an elastic band configured to press onto said telephone having said voice pick-up mechanism and against a wall of said housing;
    wherein a pouch like shape is at least partially imparted by the elastic band to said housing, thereby causing said housing to capture a majority of voice utterances of a user of the voice containment device and prevent said majority of voice utterances of said user from escaping to an area surrounding said user;
    wherein said opening is a curved opening to match generally a curve of a human face adjacent to a mouth defined by said human face; and
    wherein said housing is made of a flexible fabric and said elastic band gathers said flexible fabric at said opening to provide said curved opening.

2. The voice containment device for a telephone of claim 1 wherein said opening and said housing are sized to accommodate said telephone in its entirety.

3. The voice containment device of claim 1 further including a sound absorbing structure positioned within said housing to absorb said majority of voice utterances.

4. The voice containment device for a telephone of claim 1 wherein said attachment means includes a sleeve for accommodating said telephone and a size adjustment mechanism for changing a size of said housing.

5. The voice containment device for a telephone of claim 4 wherein said size adjustment mechanism includes a loop and fabric fastening device which can provide fastening for said housing to said sleeve at differing size adjustment positions.

* * * * *